United States Patent [19]

Bereisa, Jr.

[11] 3,917,989
[45] Nov. 4, 1975

[54] DUAL MODE CONTROL OF AN INDUCTION ELECTRIC MOTOR

[75] Inventor: Jonas Bereisa, Jr., Santa Barbara, Calif.

[73] Assignee: Aerojet-General Corporation, El Monte, Calif.

[22] Filed: Nov. 22, 1974

[21] Appl. No.: 526,382

Related U.S. Application Data

[63] Continuation of Ser. No. 432,507, Jan. 11, 1974, abandoned.

[52] U.S. Cl. ............... 318/231; 318/398; 318/415
[51] Int. Cl.$^2$ .......................................... H02P 7/42
[58] Field of Search ........... 318/138, 231, 387, 388, 318/397, 398, 415, 685, 696

[56] References Cited
UNITED STATES PATENTS

| | | | |
|---|---|---|---|
| 3,328,658 | 6/1967 | Thompson | 318/415 X |
| 3,518,516 | 6/1970 | Pawletko | 318/415 X |
| 3,601,678 | 8/1971 | Abraham et al. | 318/685 |
| 3,706,923 | 12/1972 | Dunfield | 318/415 X |

*Primary Examiner*—G. Z. Rubinson
*Attorney, Agent, or Firm*—John S. Bell

[57] ABSTRACT

An induction motor control circuit that includes a signal generator for providing a command signal having a frequency that represents desired motor speed, and a feedback control for providing a reference signal having a frequency determined by actual motor speed, is described herein. Control logic compares the frequencies of the command reference signals and causes the control circuit to operate in a first mode during acceleration in which the frequency of the drive signal supplied to the motor increases at a rate that depends upon actual motor speed. This controlled increase in drive signal frequency prevents changes that would be too sudden for the motor to follow immediately and that would therefore cause a torque loss. When a desired motor speed is attained, the control circuit operates in a second mode in which the frequency of the drive signal is fixed by the frequency of the command signal. The fixing of the drive signal frequency once a desired speed is attained provides good speed control.

5 Claims, 2 Drawing Figures

DUAL MODE CONTROL OF AN INDUCTION ELECTRIC MOTOR

This is a continuation of application Ser. No. 432,507, filed Jan. 11, 1974 now abandoned.

BACKGROUND OF THE INVENTION

1. Field of the Invention

Control circuits for electric induction motors.

2. Brief Description of the Prior Art

An induction motor typically comprises a cylindrical rotor disposed in a cylindrical stator housing. An output shaft is connected to the rotor to rotate with it. In operation, an AC electric current is supplied to the stator. This current induces an electric current in the rotor. Each current has an associated electric field. The stator field revolves about the rotor at a rate dependent upon the frequency of the AC electric signal supplied to the stator to drive the motor. Interaction between the stator and rotor fields causes the rotor and output shaft to rotate. The speed at which the rotor and output shaft rotate depends upon the frequency of the applied stator field. The rotor develops torque by lagging behind the revolving stator field. Maximum torque is achieved when the drive signal has a frequency just slightly greater than the actual frequency (rotating speed) of the rotor so that the rotor lags behind the stator field by a small amount. Frequency differences that are either too large or too small produce very little torque.

The most common induction motor control is a very simple control circuit that generates a drive signal having a frequency that always corresponds to a desired motor speed commanded by an operator. This control circuit is sometimes called a fixed frequency mode control circuit because the frequency of the drive signal is always fixed at a value determined by desired motor speed. Drive signal frequency is never varied to account for actual motor speed. This control circuit has one very serious drawback. It causes the motor to have a very low output force (torque) during start-up and acceleration. The frequency of the drive signal during those periods is so much greater than the actual frequency of the rotor that it cannot immediately follow the field and rotate with high torque. The lack of torque during start-up prevents the motor from driving a load that it could handle very easily after reaching some predetermined speed. Instead of accelerating to a desired speed when subjected to such a load, the motor either stalls or operates at a very low speed, draws large current, and burns out.

One system has been designed to provide higher torque during start-up and acceleration. That system comprises a closed loop control that supplies the stator with the drive signal having a frequency that is the sum of the actual motor frequency plus a predetermined constant frequency. This control system is sometimes called a "constant slip mode" control circuit because the rotor "slips" behind the stator field by the same frequency at all speeds. It causes the motor to develop good torque at all speeds because the drive signal always has a frequency that is just slightly greater than the frequency of the rotor. But, this system does have one significant drawback. It will not accurately maintain a desired speed. The motor continues to accelerate until stabilized by an increasing load. Designs for controlling speed by reducing the voltage of the drive signal have been considered. These have not been successful because induction motors require drive signals having a fixed frequency-to-voltage ratio which is predetermined by the design characteristics of the motor. Any deviation from this predetermined frequency-to-voltage ratio in the drive signal limits motor performance. The prior art does not teach an induction motor control that causes an induction motor to operate with a high output force and also provides good speed control.

SUMMARY OF THE INVENTION

This invention comprises a motor control circuit for providing an induction motor with both high torque and good speed regulation. The control circuit includes a command control for providing a cyclic command signal having a frequency representing a desired motor speed, and a feedback circuit responsive to the induction motor for providing a reference signal having a frequency slightly greater than the frequency of the induction motor. Drive signal generating apparatus responsive to both the command and reference signals provides the induction motor with a drive signal having a frequency equal to the lesser of the command and reference signal frequencies.

The induction motor control circuit thus provides the motor with a drive signal having a frequency that increases during motor acceleration at a rate controlled in accordance with actual increasing motor speed. This causes the motor to have a high output torque and also minimizes the time required to reach a desired speed. Upon reaching the desired speed, the control circuit provides the motor with a drive signal having a frequency that is fixed equal to that of the command signal. This provides good speed control by preventing the motor from receiving any drive signal having a frequency that represents an operating speed that is higher than the desired speed represented by the frequency of the command signal.

The embodiment illustrated herein includes control signal logic for comparing the frequencies of the feedback and command signals, and transmitting the lesser frequency signal to control operation of drive signal generating apparatus. The drive signal generating apparatus is constructed so that the frequency of the signal from the control logic controls both the frequency and voltage of the motor drive signal. The control circuit can thus effectively vary the operating speed of the induction motor by varying the value of the drive signal while maintaining a constant drive signal frequency-to-voltage ratio.

The motor control circuit of this invention minimizes the effect of variations in load on the induction motor. When a motor that is operating at a desired speed is subjected to a load that is large enough to slow the rotor to an undesirably slow speed, the frequency of the feedback reference signal will be dropped below that of the command signal, and the frequency of the drive signal will drop to a value that causes the motor to respond to the additional load with maximum torque. The motor is thus returned to the commanded speed as quickly as possible. If the motor is stalled by a load greater than its peak torque capability, the control system of this invention prevents the motor from drawing large currents and burning out. The frequency of the feedback reference signal drops to a very low value at stall and causes the drive signal to drop to a very low frequency and voltage that will not harm the motor.

BRIEF DESCRIPTION OF DRAWING

The objects, features, and advantages of this invention which is defined by the appended claims, will become further apparent from a consideration of the following description of the accompanying Figures, in which:

DETAILED DESCRIPTION OF DRAWING

Figure 1:
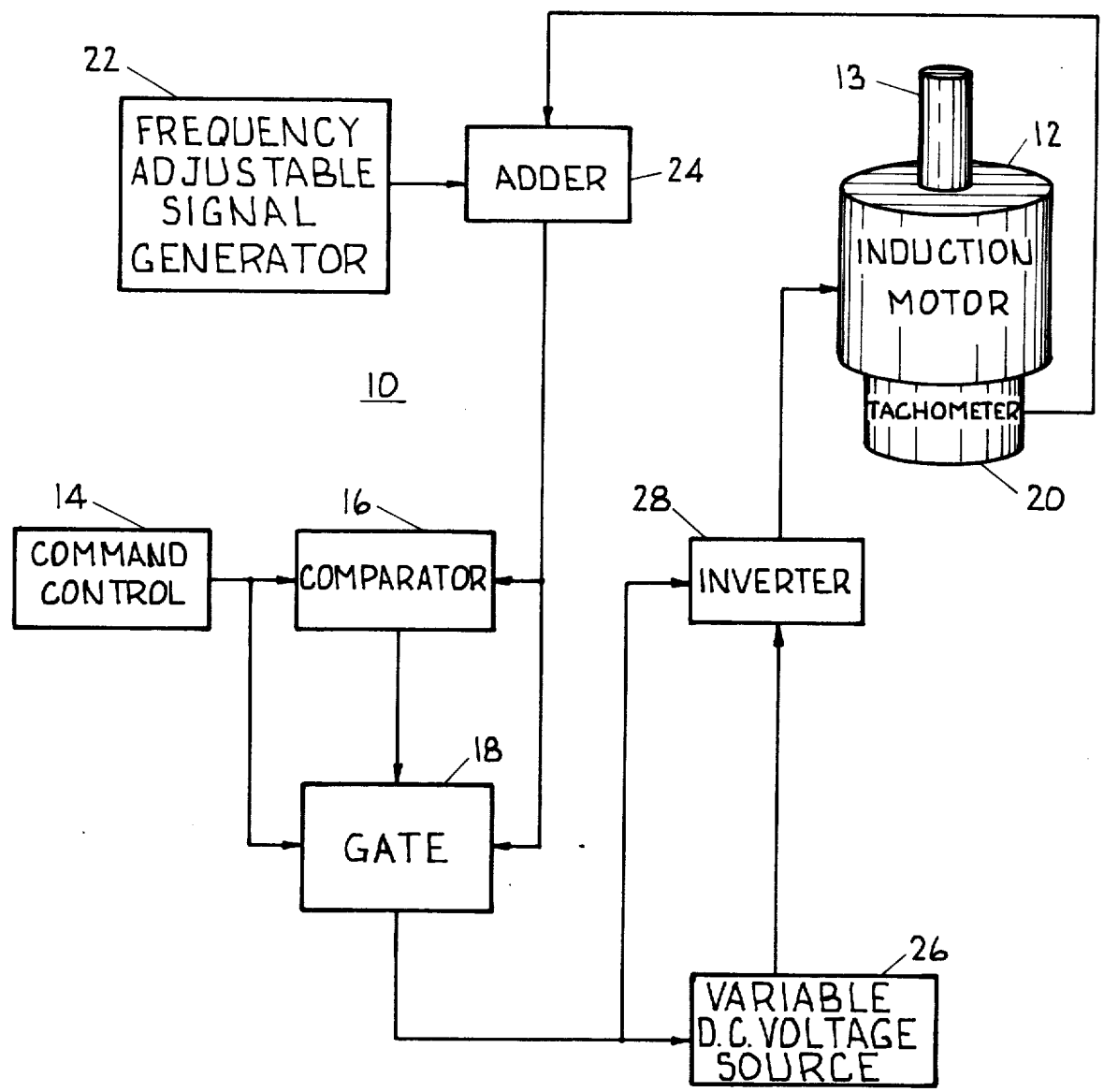
FIG. 1 is a schematic, box-level circuit diagram of one embodiment of the induction motor control system of this invention.

FIG. 1 illustrates a control circuit 10 for operating an induction motor 12 having a rotatable output shaft 13. Circuit 10 is constructed to provide a drive signal to motor 12, and the frequency of this drive signal determines that rate at which motor output shaft 13 rotates. The rotation rate of output shaft 13 will be referred to herein as the operating speed of motor 12. Control circuit 10 includes a variable frequency command control 14 for providing an AC command signal to a comparator 16 and gate 18. The circuit 10 also includes a tachometer 20, frequency adjustable signal generator 22, and adder 24 for together providing comparator 16 and gate 18 with a reference signal having a frequency that represents a speed slightly greater than the actual operating speed of the motor 12. Comparator 16 and gate 18 are constructed to compare the command and reference signals and transmit the signal having the lesser frequency to a variable voltage source 26 and inverter 28. Signal generator 26 is constructed to provide a DC electric signal having a voltage level determined by the frequency of the signal received from gate 18. Inverter 28 inverts that signal at a rate determined by the frequency of the control signal from gate 18 to convert the DC signal to an AC drive signal for motor 12.

In operation, generator 22 is adjusted to provide a signal having a low frequency that represents the frequency difference or speed lag between the stator field and rotor at which motor 12 develops maximum torque. As explained previously in the discussion of the prior art, the frequency difference that provides maximum torque is a known operating parameter of any induction motor, and is relatively small. Command control 14 is set to provide a command signal having a frequency that represents a desired motor operating speed. Assuming motor 12 is starting from rest, the reference signal supplied by adder 24 to comparator 16 and gate 18 will initially consist of only the signal from generator 22 and thus have a frequency that is much lower than that of the command signal. Comparator 16 and gate 18 thus transmit the reference signal to DC voltage source 26 and inverter 28. The low frequency of the reference signal causes generator 26 and inverter 28 to provide motor 12 with a drive signal having low voltage and frequency. This drive signal starts motor output shaft 13 rotating. As shaft 13 rotates, tachometer 20 provides a signal having a frequency that represents the rate of rotation. This signal increases the frequency of the reference signal, which in turn increases the voltage and frequency of the drive signal and the operating speed of motor 12. When motor 12 reaches the commanded speed, the command signal 14 will have a lesser frequency than the reference signal. Comparator 16 and gate 18 transmit the command signal instead of the reference signal, and the frequency of the drive signal is fixed at that of the command signal. Motor 12 is thus prevented from exceeding the commanded speed.

Figure 2:
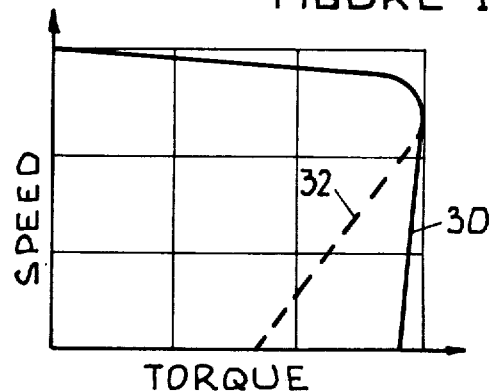
FIG. 2 is a graph that shows the torque produced at different speeds by a motor controlled by the circuit shown in FIG. 1.

The graph of FIG. 2 illustrates the torque vs speed characteristics of an induction motor operated by control circuit 10 as compared with the same motor operated by a conventional control that always supplies the motor with a drive signal having a frequency equal to that of the command signal. Plot 30 illustrates control by circuit 10, and plot 32 illustrates control by the conventional circuit. The two plots coincide between points 33 and 34. As FIG. 2 illustrates, control circuit 10 causes an induction motor to operate with high torque during start-up, at low speed and during acceleration, while a motor driven by a conventional control circuit will develop very little torque during these periods. The high torque is produced because a stationary or slow-moving rotor will respond better to a drive signal that has low initial frequency and voltage values which increase at a rate controlled in accordance with increasing motor speed, than it will to a drive signal having high initial frequency and voltage values. In addition to providing high torque, the increasing drive signal provided by control circuit 10 also causes an induction motor to reach the desired speed very quickly. And, control circuit 10 also provides effective operation over a wide range of different speeds. Voltage source 26 and inverter 28 are both controlled by the frequency of the signal from gate 18 and maintain the drive signal at a constant frequency-to-voltage ratio. An operator can thereby command any desired motor speed, and the control circuit will provide rapid, high-torque acceleration either from rest or from some lower speed up to that desired speed.

Control circuit 10 also minimizes the effect of load variations on motor 12 during operation. The circuit accelerates the motor 12 to a desired speed in a minimum time and with maximum torque regardless of load. Once a desired operating speed is reached, the circuit 10 maintains that speed by fixing the frequency of the signal driving motor 12 at the frequency of the command signal from control 12. If the motor is subsequently slowed by an increased load to a speed that causes the reference signal from adder 24 to have a lower frequency than that of the command signal from control 14, circuit 10 will cause the drive signal to have a frequency corresponding to that of the reference signal. The frequency of this reference signal, as determined by tachometer 20, voltage source 22, and adder 24 will be such as to cause the motor 12 to operate at peak torque and return to the commanded speed in a minimum time. If the load becomes greater than the peak torque capability of motor 12, the motor will stall. Many conventional control circuits allow a stalled motor to draw large currents that burn out the motor. Control of the circuit 10 prevents a stall from causing such motor damage. Rotor speed at stall is zero. The frequency of the reference signal from adder 24 thus drops to a very low value. This low value reference signal cause DC voltage source 26 and inverter 28 to provide a stalled motor with a very low frequency and voltage drive signal that will not burn it out or cause other damage. Control circuit 10 thus maximizes motor performance and also effectively protects the motor from damage.

Having thus described the construction, operation, and advantages of one embodiment of this invention, a

What is claimed is:

1. A circuit for controlling operation of an electric induction motor, said control circuit comprising:
   command signal generating means for providing a cyclic command signal having a frequency representing a desired motor speed;
   reference signal means responsive to the induction motor for providing a cyclic reference signal having a frequency representing a speed slightly greater than the operating speed of the induction motor;
   drive signal means responsive to said command and reference signals for providing the induction motor with a drive signal having a frequency corresponding to the lesser of said command and reference signal frequencies.

2. The control circuit of claim 1 in which said drive signal means comprise:
   means for providing a control signal having a frequency corresponding to the lesser of said command and reference signal frequencies;
   signal generating means responsive to said control signal for providing a DC electric signal having a voltage level determined by the frequency of said control signal; and
   inverter means responsive to said control and DC signals for providing said drive signal by inverting said DC signal at a rate determined by the frequency of said control signal, said drive signal means thereby varying both the amplitude and frequency of said drive signal to permit multi-speed operation of an induction motor requiring a drive signal having a predetermined amplitude-to-frequency ratio.

3. The control circuit of claim 2 in which said control signal providing means comprise:
   comparator means for comparing the frequencies of said command and reference signals and providing an output signal having a first value when said reference signal has the lesser frequency and a second value when said command signal has the lesser frequency; and
   gating means responsive to said command, reference, and comparator means output signals for transmitting said reference signal to said signal generating means and said inverter means when the output signal from said comparator means has said first value, and for transmitting said command signal to said signal generating means and said inverter means when the output signal from said comparator means has said second value.

4. The control circuit of claim 3 in which said reference signal means comprise:
   means for providing a cyclic motor speed signal having a frequency representing the operating speed of the induction motor; and
   signal incrementing means for increasing the frequency of said motor speed signal by a pre-selected small amount to thereby provide said reference signal.

5. The control circuit of claim 4 in which:
   the circuit comprises a circuit for controlling operation of an induction motor having a rotatable output shaft, the torque of said shaft being a measure of motor output force;
   said means for providing said motor speed signal comprise tachometer means for providing an output signal having a frequency representing the rate of rotation of said motor output shaft;
   the output torque of said induction motor is determined at least in part by the frequency difference between said tachometer output signal and said motor drive signal; and
   said signal incrementing means includes means for adjusting the amount by which said tachometer output signal is incremented to thereby control the output torque generated by the induction motor upon receipt of a drive signal having a frequency corresponding to the frequency of the incremented reference signal.

* * * * *